Feb. 14, 1933. A. L. VEIT 1,897,285
AIRPLANE CONTROL APPARATUS
Filed Sept. 16, 1931 2 Sheets-Sheet 2
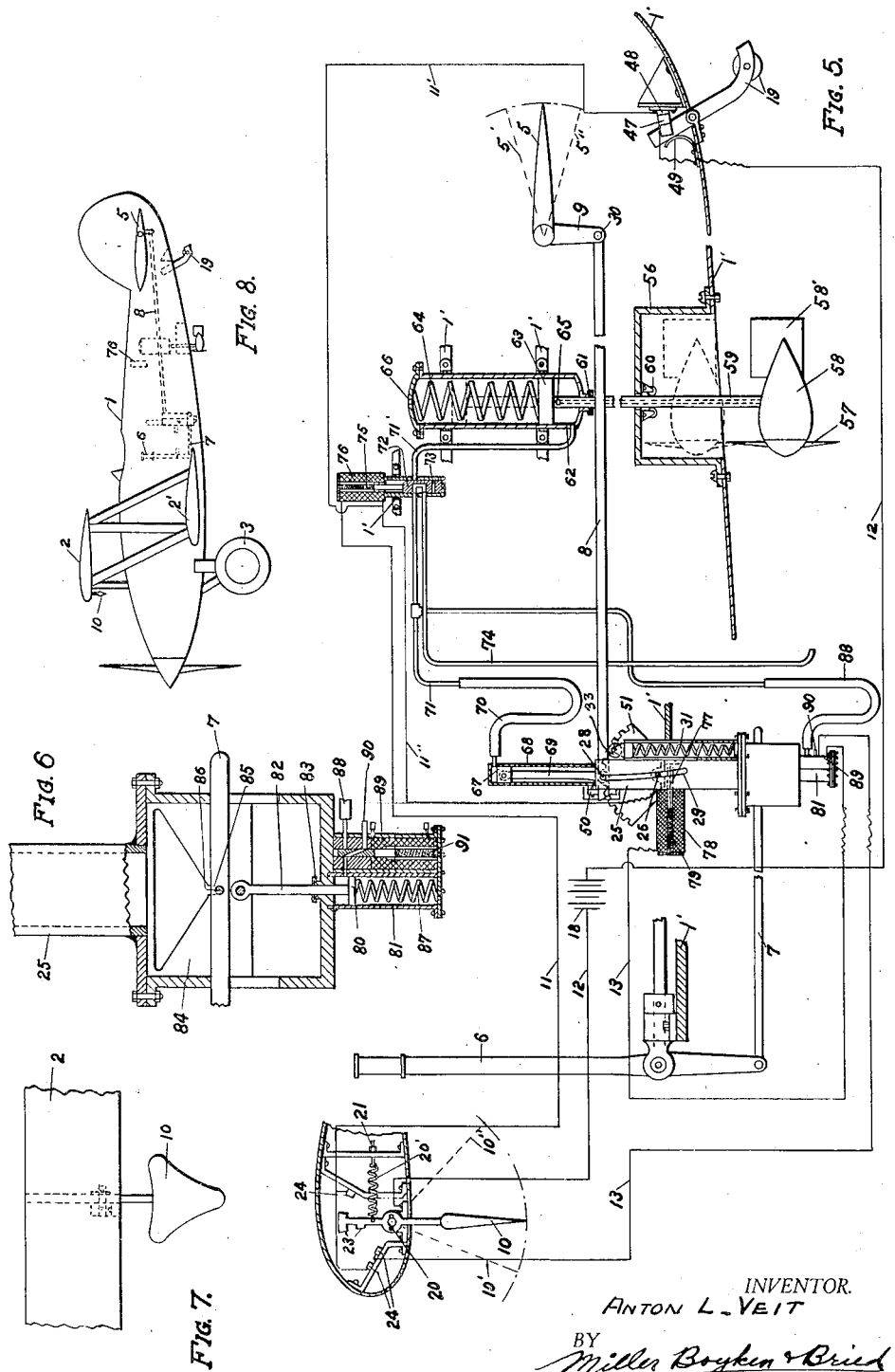
INVENTOR.
ANTON L. VEIT
BY
Miller Boyken & Bried
ATTORNEYS.

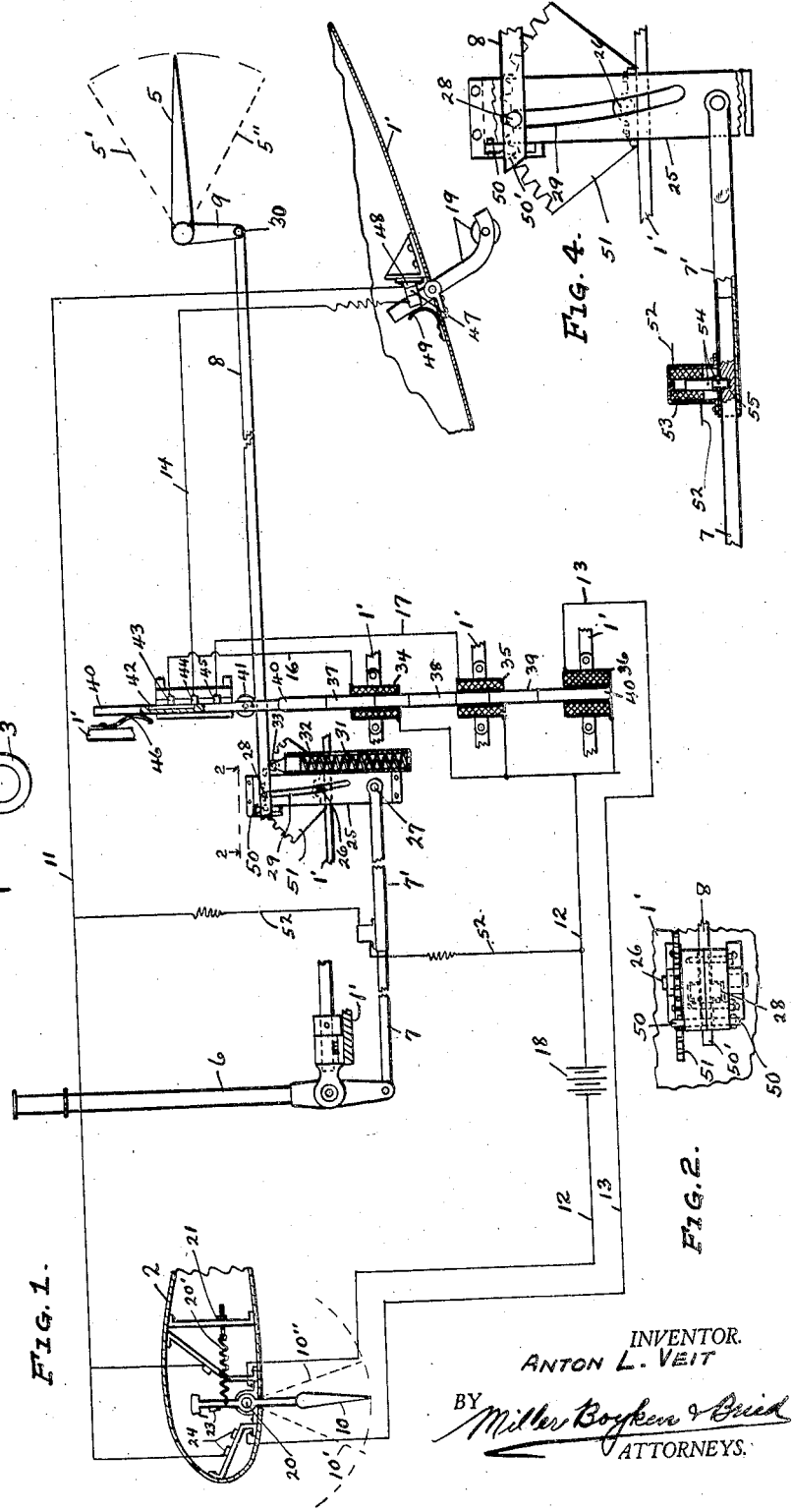

Patented Feb. 14, 1933

1,897,285

UNITED STATES PATENT OFFICE

ANTON L. VEIT, OF SAN FRANCISCO, CALIFORNIA, ASSIGNOR OF ONE-HALF TO WILLIAM WAGNER, OF SAN FRANCISCO, CALIFORNIA

AIRPLANE CONTROL APPARATUS

Application filed September 16, 1931. Serial No. 563,078.

This invention relates to airplane control and has for its objects automatically operated apparatus which will prevent stalling of a plane in flight and which will also bring a plane out of a dive. Another object of the invention is such automatic control apparatus which will cooperate with the usual hand control stick or its equivalent. Other objects of the invention will appear in the following description and accompanying drawings.

In the drawings two variations in the apparatus for actuating the automatic control are shown, Figs. 1 to 4 being an entirely electrically operated arrangement, and Figs. 5 to 8 being a combination electrical and pneumatically operated arrangement.

Fig. 1 is a schematic layout of the electrically operated control elements shown in operative relation to the airplane elements involved.

Fig. 2 is a plan view of the linkage lever of Fig. 1 and as seen from the line 2—2 thereof (enlarged).

Fig. 3 is a reduced size side view of an airplane equipped with the apparatus of Fig. 1, the position of the main parts being indicated by the dotted lines.

Fig. 4 is an enlarged detailed view of linkage lever and stick connecting rod.

Fig. 5 is a schematic layout of the combination electrical and pneumatically operated control elements shown in operative relation to the airplane elements involved.

Fig. 6 is an enlarged view of the lower portion of the linkage lever of Fig. 5.

Fig. 7 is a front view of the wind or air-pressure operated vane, the setting of which governs the operation of the apparatus.

Fig. 8 is a reduced size side view of an airplane equipped with the apparatus of Fig. 5, the position of the main parts being indicated by the dotted lines.

Before describing the apparatus in detail, it will make it easier to understand if the reason for it as well as its general mode of operation be first explained, and it may therefore be said:

The apparatus is designed to automatically take the control of an airplane away from the pilot at the two principal points of great danger—first, just before the ship is about to stall in making a climb, and pull the ship back into horizontal flight so as to prevent a tail spin or side slip—second, the moment a diving plane exceeds a certain speed.

Both the above operations assume that for some reason or another the pilot had moved the stick backward or forward too far in view of the critical condition of the plane, and therefore in order to prevent a wreck the apparatus takes the control from him and brings the ship back to an even keel, though the moment the ship is within the safe limits of minimum or maximum speed the apparatus at once puts the control back into the pilot's hands. Two variations in the apparatus for accomplishing the above are shown in drawings, and it should be understood that both schemes are subject to many further variations in detail and are therefore to be understood broadly as showing a plurality of means for effecting the purpose desired.

In the construction shown in Figs. 1 to 4, 1 is the body of the plane or fuselage, 1' is any substantial part of the body frame to which apparatus may be secured or mounted. 2 is the upper wing, 2' the lower wing (in this case a biplane being shown), 3 the wheels, 5 the usual elevators, 6 the pilot's stick pivoted to the frame 1' and connected by suitable linkage 7, 8 to the operating arms 9 of the elevators, it being understood there is an elevator on both sides of the fuselage, 10 a wind pressure actuated device or vane positioned at any convenient part of the ship so that it is exposed to the wind pressure induced by flight, 11, 12, 13, 14, 15, 16, 17 circuit wires to various parts of the apparatus from battery 18 carried by the plane, and 19 a drag arm under the tail of the fuselage adapted to drag upon the ground and keep the automatic electric control circuit broken when taking off until the speed is such as to lift the plane with the pilot in full manual control.

The principal element of the automatic control may be said to be the vane 10 which responds to varying wind pressure upon it to close electrical circuits both when the pressure is too low as well as when too high to start the remainder of the apparatus functioning. This vane is pivoted at 20 to the wing structure and pulled by a spring 20' to normally project angularly forward as indicated by the dotted position 10', the spring being adjustable as by a nut 21 so that the vane is urged outward, with a force to overcome which would require a wind pressure developed by a predetermined minimum speed of flight required for safety in banking on a turn, say for example a hundred mile speed, and at a speed less than this the vane will swing forward and by means of a contact 22 carried at its upper end will close an electrical circuit through wire 11 and 12, the latter being grounded to the arm of the vane which is made conductive.

If, on the other hand, the wind pressure increases to an abnormal degree and beyond that induced by the highest flying speed, say arbitrarily a 200 mile speed, as would be set up if the ship was making a dive, then the vane would be forced beyond the safe speed position 10'' toward the unsafe speed position 10'' (the precise position depending on the strength of spring used, its setting, and the positions of the electric contacts) to operate contacts 23, 24 to thereby close an electrical circuit between wires 11 and 12 as well as one between 11 and 13 all for a purpose to be described.

Returning to the pilot's stick 6, this instead of being directly linked to elevator arm 9 is linked thereto through the intermediary of a lever 25 itself pivoted at 26 to a rigid part 1' of the frame and pivoted in turn at 27, 28 to inner ends of link rods 7 and 8 respectively.

Intermediate lever 25 is vertically slotted in the form of a yoke to freely pass link rod 8 and transversely slotted in an arcuate manner as at 29 to pass and guide the pivot pin or pin bearings of pivot 28 along a path passing over the axis 26 of the intermediate lever 25, the arc of slot 29 being drawn from the pivot center 30 of link 8 connection to elevator arm 9 with stick 6 in central or neutral position and elevator 5 in neutral or horizontal position as shown by full lines in the drawings, and through which construction the pivot 28 of the forward end of the lever could (when elevator 5 and stick 6 are both in central or neutral position) be moved down and up in slot 29 past the fixed pivot 26 without changing the position of the elevator. But if intermediate lever 25 were tilted forward or backward by reason of the stick being in other than central position, then if pivot 28 were moved down the slot 29 it would swing the elevators up or down as the case might be.

The forward end of rod 8 is, however, normally held up with pivot 28 at the upper end of slot 29 through movable means, such for instance as by a long coil compression spring 31 operating in a housing 32 secured to and carried by lever 25 and which spring is provided with a small roller 33 bearing under link rod 8.

Upon closing of the various circuits by movement of the vane 10 as described, rod 8 is pulled downward in slot 29 progressively through the agency of several axially aligned solenoids 34, 35, 36 which are arranged to operate respectively on armatures 37, 38, 39 carried on an insulating bar 40 which is slotted to pass rod 8 and supplied with a roller 41 bearing on top of rod 8 so as to pull it downwardly when the solenoids are energized. Bar 40 also extends above roller 41 and carries a metal contact switch plate 42 which will make contacts with switch terminals 43, 44, 45 as the rod bar is moved downward, a spring 46 bearing against bar 40 or other suitable means insuring proper electrical contact being made.

Circuit wire 12 connects to one terminal of the three solenoids as shown, wire 14 to switch terminal 44, wire 16 from switch terminal 43 to other terminal of solenoid 34, and wire 17 from switch terminal 45 to other terminal of solenoid 35.

Besides the circuits described, wire 13 leads to the other terminal of solenoid 36 to pull pivot 28 below center 26 and to the lower end of slot 29 under certain conditions as will be described.

Drag arm 19 carries a contact button 47 connected with wire 14 adapted to make contact with a button 48 connected with wire 11 to maintain the circuit closed between these wires when the plane is off the ground, as a spring 49 resiliently forces the upper end of the drag arm backward as shown in Fig. 1. The moment the drag arm strikes the ground however the circuit between contacts 47, 48 is broken.

Before describing the modifications shown in Figs. 5 to 8 the operation of the apparatus of Figs. 1 to 3 will be described as it will make the understanding of the other figures easier.

Assuming the controlling vane 10 to be set for a speed between dangerous minimum and maximum it will maintain the operative circuits broken between wires 1, 12 and 13 so that the pilot is free to operate the stick to raise or depress the elevators in the ordinary way, lever 25 acting merely as a bell crank while pivot 28 is kept at the top of the slot 29 by spring 31. However, should the pilot be making too great an angle of ascent or dangerous turn at a low speed with danger of the ship stalling, the wind pressure decreasing on vane 10 it will move toward 10' and before the danger becomes imminent will close the battery circuit between wires 11 and 12, (drag switch 47, 48 being also closed) this will send a current through sliding switch buttons 44, 43 and wire 16 to energize solenoid 34 and pull down armature 37.

Bar 40 sliding downward will carry switch block 42 away from contact 43 and connect up 44 and 45 thereby energizing solenoid 35 to pull on armature 38 and bring pivot 28 down slot 29 to a point aligned over pivot 26 and at which point elevators 5 will have been swung back from a raised position 5' to central position 5, thus bringing ship out of dangerous position independently of where pilot's stick happens to be, and as soon as ship picks up speed circuit 11, 12 will be broken by movement of vane and spring 31 will move pivot 28 upward in slot 29 to again start ship ascending until pilot again takes manual control of ship and which can be done by moving stick to or through central position as will be later explained.

In case ship was descending at a dangerous speed or in the act of making a dive, increased wind pressure on vane 10 would force it back toward 10" and thereby close contacts between wires 11 and 13 as well as between 11 and 12 through the arm of the vane. This would at once actuate solenoids 34, 35 as before, and also solenoid 36 in succession (on account of closing of circuit through wire 13) so that pivot 28 would be drawn down in slot 29 past neutral center 26 to the bottom of the slot, and assuming stick 6 to have been previously pushed forward with elevators depressed, this would have rocked lever 25 so that slot 29 would no longer be on an arc from 30, and pivot 28 coming down in the slot passed neutral center 26 to the bottom would swing the elevators beyond neutral position into lifting position, so as to automatically bring ship out of the dive. Of course the moment the speed of the ship decreased to a point within the safe limits vane 10 would swing back to intermediate position, breaking the circuit, and spring 31 would at once restore pivot 28 to position at top of slot making elevators take whatever position they had at the time the automatic apparatus took control, and this for the reason that the moment the vane 10 swings in either direction far enough to close a circuit and pivot 28 starts to move downward, a gravity bolt 50 slidably carried on lever 25 and normally held up by hanging over the outer end of rod 8 as at 50', falls into a notch of a quadrant 51 fixed around axis 26 so as to at once lock lever 25 in whatever position it may be. At the same time, however, a branch circuit 52 energizes a magnet 53 to raise a gravity or spring latch 54 to temporarily break the continuity of rod 7 so that all control of pilot on elevators is taken away. This is effected by making rod 7 of two sliding or telescoping sections 7 and 7', latch 54 and its magnetic release being secured to and carried by section 7 and the latch when down engaging a hole in section 7' to make both sections operate as one solid rod. Thus while the automatic apparatus has control of the elevators either during periods of too low or excessively high speeds, the pilot's stick is mechanically disconnected from the elevators, and it is not until the dangerous slow speed or the excessively high speed has been overcome and vane 10 is again swinging in the safe speed area that the circuits are broken, pivot 28 is moved to the top of slot 29, lever 25 is unlocked, elevator automatically levels off through wind pressure and the pilot will again be put in control the moment he moves stick 6 to neutral or central position to permit latch 54 to fall into the hole 55 in rod section 7.

In the variations shown in Figs. 5 to 8 the air pressure vane, main circuit wires, drag arm, stick, and numerous other parts are the same as previously described and are designated by the same numerals for ease of identification. Fig. 7 shows a preferred form in a front view of the air vane 10, though other forms will serve, also as stated, any other position on the airplane where the vane is freely exposed to the wind will do, though the position on the tip of the upper wing is preferred as being out of the direct propeller stream. In the apparatus of Figs. 5 to 8, however, while the actuating elements and circuits are the same as those previously described, the motive power for shifting the pivot 28 is compressed air instead of the electric solenoids used in the other construction. The compressed air is generated by a compressor run by a propeller of its own, and which compressor and its propeller is lowered into the wind stream automatically to pump a fresh supply of air into a storage tank when the pressure falls. The arrangement is clearly shown in Fig. 5 and wherein 56 is an inverted "well" extending into the fuselage and adapted to fit within which well is an air fan driven air compressor. This compressor may be of any desired internal construction driven by an air propeller 57 and the compressor being enclosed in a stream line casing 58 and provided with a vertical fin 58' for holding it in operative relation to the air stream. This compressor is suspended on the lower end of a heavy hollow piston rod 59 which passes upward between guiding rollers 60 and through a stuffing box 61 into a compressed air storage chamber 62 where it is secured to a piston 63 normally forced downward by the combined effects of a spring 64 and the weight of the compressor on the lower end of the rod.

Rod 59 serves as pipe to convey compressed air from the compressor by way of side opening 65 to the space below the piston, and upon the pressure building up to a predetermined value it will lift the compressor bodily out of the air stream, and conversely will lower it upon drop in pressure, thus automatically maintaining a suitable working pressure in the tank. The upper end of the tank is vented at 66.

In the present construction upon closing of the electrical circuits by vane 10 pivot 28 is forced downwardly in slot 29 of intermediate lever 25 by means of an air piston 67 working in a cylinder 68 carried by lever 25, the piston provided with a rod 69 connected with pivot 28 so that upon admitting air under pressure to the space above the piston from a flexible hose 70 pivot 28 will be displaced downward until the air pressure is broken and spring 31 returns pivot 28 (and its rod 8) to the upper position.

Air hose 70 leads through a pipe 71 by way of a two-way piston type valve 72 and pipe 71' to compressed air space of tank 62. Valve 72 is provided with a through passage 73 which, when the valve is raised will be brought into alignment with pipes 71, 71', and when lowered pressure pipe 71' is shut off and a branch passage in the valve connects pipe 71 with an exhaust pipe 74 discharging to atmosphere, so as to break the pressure in cylinder 68.

Valve 72 is normally dropped by gravity or a small spring 75 to exhaust position, and is raised by a solenoid 76 upon closing of the electric circuits by either way excessive swinging of vane 10. However, as it is desirable that in bringing the ship out of the danger of a stall, pivot 28 should only be pushed to about neutral center 26 to bring elevators in intermediate position, a removable stop is provided at the point desired, and which stop consists of a pin 77 or extension of the core of a solenoid 78 secured to and carried by lever 25 and which pin is pressed outwardly by a light spring 79 to normally stop further descent of pivot 28, but which pin is instantly withdrawn upon energizing of the solenoid by closing its circuit by excessive rearward swinging of vane 10, at the same time that valve solenoid 76 is energized through wires 11, 11', 11'' and 13 by way of drag arm switch as indicated and line 12 from battery 18 or other source of electrical energy. It will therefore be seen that pivot 28 is forced down to stop pin 77 when ship is in danger of stalling, but when descending at excessive speed the swinging of the vane in rearward direction closes the additional circuit to solenoid 78 to withdraw the stop 77 and permit pivot 28 to descend to lower end of slot 29.

In the construction now being described the mechanical disconnecting of rod 7 instead of being effected by means of a solenoid-operated latch as described for the construction shown in Fig. 1, is here carried out by a small air piston 80 operating in a small cylinder 81 carried by the lower end of intermediate lever 25 and which piston is provided with a rod 82 passing through stuffing box 83 into an enlarged portion of lever 25 where it connects to and between a pair of opposed yoke-like slidable blocks 84 having a small central notch 85 which engages pivot pin 86 projecting from rod 7. The rod in this case passes freely through slots in lever 25 so that it can slide back and forth therein when released without operating the lever, but when blocks 84 are up in position shown in Fig. 6 the pivot of rod 7 is locked in notch 85 so that it operates lever 25 as though directly pivoted thereto. However, when blocks 84 are pulled down by admission of compressed air above piston 80, pin 86 is released from notch 85 and finds itself free in a space long enough to permit free sliding of the rod 7 when pilot moves the stick 6.

Piston 80 is normally pushed upward by a stiff spring 87 so that the slanted upper edges of blocks 84 will engage pin 85 and force it either way into the notch. Compressed air is admitted to the space above the piston from a flexible hose 88 upon actuation of a solenoid valve 89 and exhausted at 90 upon lifting of the valve by a spring 91. The circuit energizing solenoid valve 89 is in series with that of solenoid 78 as it is not operated except to reduce excessive speed of the ship.

In considering the description of the construction of Figs. 5 to 8 it will be seen to function substantially like the first construction, except that the sliding blocks 84 will force the reconnection of rod 7, instead of requiring the pilot to move the stick back to or through neutral to obtain a re-engagement.

Having thus described two modifications of apparatus for carrying out my invention, what I claim is:—

1. In an airplane automatic control, a movable device exposed to the varying wind pressure and responsive thereto, means determining the general position of said device during normal flight and wind pressures, an electrical circuit actuated by said device at other than normal wind pressures, means disconnecting the pilot's manual control from operative connection with the elevators of the plane, means re-establishing the connection of the pilot's manual control upon resumption of normal wind pressures, and means swinging the elevators of the plane upon the actuation of said circuit.

2. In an airplane automatic control, a movable device exposed to the varying wind pressure and responsive thereto, means determining the general position of said device during normal flight and wind pressures, an electrical circuit actuated by said device at other than normal wind pressures, means disconnecting the pilot's manual control from operative connection with the elevators of the plane, means tending to re-establish the connection of the pilot's manual control upon resumption of normal wind pressures, and means swinging the elevators of the plane upon the actuation of said circuit.

3. In an airplane automatic control, a movable device exposed to the varying wind pressure and responsive thereto, means determining the general position of said device during normal flight and wind pressures, electrical circuits actuated by said device at other than normal wind pressures as developed in normal flight, means set in motion by said circuits for swinging the elevators of the plane in direction to bring the plane out of a stalling climb or excessive speed descent respectively as the wind pressure falls or rises beyond normal, and means for automatically rendering the pilot's manual control of the elevators inoperative during the operation of the automatic control.

4. In an airplane automatic control, a movable device exposed to varying wind pressure and responsive thereto, means determining the general position of said device during normal flight and wind pressures, an electrical circuit actuated by said device at other than normal wind pressures, and means swinging the elevators of the plane upon actuation of said circuit, the means for swinging the elevators including an air-operated power cylinder, a compressed air tank, a wind-operated air compressor, and means controlled by the pressure in the tank for exposing and removing the air-operated compressor to and from the operative effect of the air stream so as to hold the pressure substantially constant.

5. In an airplane automatic control, a movable device exposed to the varying wind pressure and responsive thereto, means determining the general position of said device during normal flight and wind pressures, an electrical circuit actuated by said device at other than normal wind pressures, and means swinging the elevators of the plane upon actuation of said circuit, the means for swinging the elevators including an air-operated power cylinder, a compressed air tank, a wind-operated air compressor, and means controlled by the pressure in the tank for lowering and raising the compressor into and out of the air stream in a manner to hold the pressure between maximum and minimum working pressures.

6. In an airplane, a manual control including a rod connection to the elevators, an intermediate lever interposed in the rod and to which the rod sections are pivoted, means pivoting said intermediate lever to the plane structure, and means for shifting the pivotal connection of one of the rod sections on said intermediate lever along a path following an arc from the rod connection to elevator.

7. In an airplane, a manual control including a rod connection to the elevators, an intermediate lever interposed in the rod and to which the rod sections are pivoted, means pivoting said intermediate lever to the plane structure, and means for shifting the pivotal connection of one of the rod sections on said intermediate lever along a path passing over the fixed pivotal axis of the intermediate lever.

8. In an airplane, a manual control including a rod connection to the elevators, an intermediate lever interposed in the rod and to which the rod sections are pivoted, means pivoting said intermediate lever to the plane structure, means for shifting the pivotal connection of one of the rod sections on said intermediate lever, and means for rendering the connection of the other section of the rod to said lever inoperative.

9. In an airplane, a manual control for the elevators, means responsive to a dangerous change of wind pressure during flight rendering said manual control inoperative, and means automatically controlling said elevators during the period of dangerous wind pressures.

10. In an airplane, a compressed air tank, a wind operated air compressor, and means controlled by the pressure in the tank for exposing and removing the air compressor to and from the operative effect of the air stream.

ANTON L. VEIT.